United States Patent Office 3,377,139
Patented Apr. 9, 1968

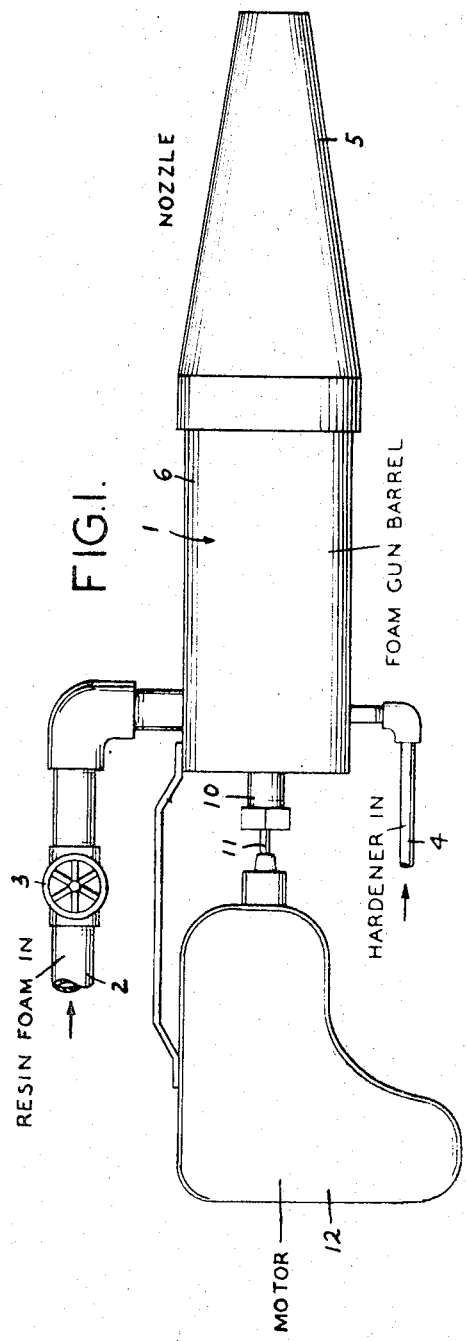
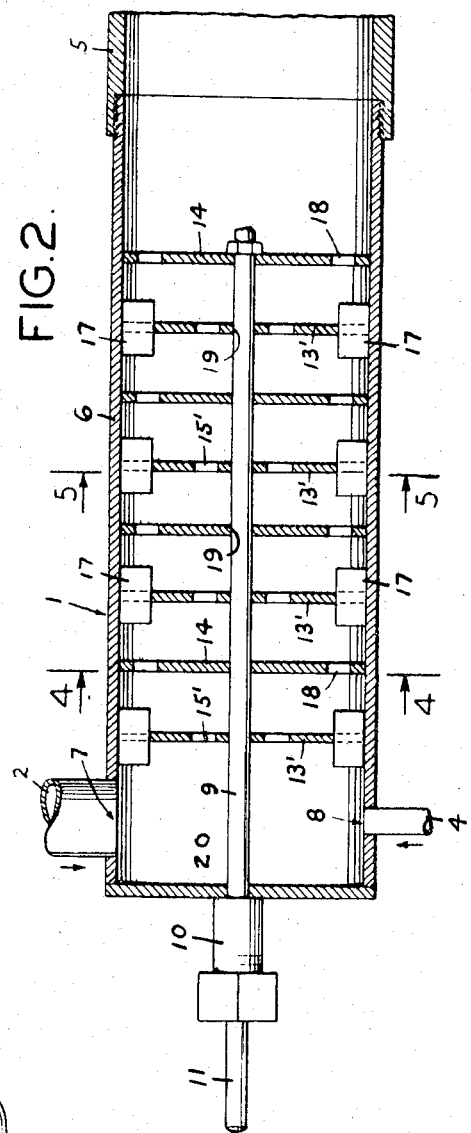

3,377,139
APPARATUS FOR PREPARING LOW DENSITY
UREA-FORMALDEHYDE FOAMS
Rob R. MacGregor, Hopewell, and William P. Moore, Jr., Chester, Va., assignors to Allied Chemical Corporation, New York, N.Y., a corporation of New York
Filed June 21, 1963, Ser. No. 289,489
1 Claim. (Cl. 23—285)

ABSTRACT OF THE DISCLOSURE

Apparatus for blending and conditioning a foam which includes a chamber having a rotatable shaft with a plurality of first and second foam treating disc members having openings therein, the first foam treating discs having a plurality of vanes thereon.

This invention relates to an apparatus for simultaneously mixing and conditioning urea-formaldehyde foams.

It is known to produce urea-formaldehyde resin foams by first separately preparing two components which, when mixed and cured, will yield a porous, solid, resinous mass or body. One component may take the form of an aqueous urea-formaldehyde resin solution, the other an aqueous acid solution which acts, when mixed with the resin solution, to harden and cure the resin. In one of the components a foaming agent is incorporated such as an alkyl aryl sulfonate or other suitable surfactant. Next a foam is produced by known means of the component to which the foaming agent has been added. Thereafter the foamed component is mixed with the other component whereby the foam is hardened or cured and becomes gelled and set in its final thermoset condition.

Such foams are useful for many purposes, including home insulation, wherein foam can be directed, immediately upon its preparation and partial cure, into cavities in the walls, ceilings and attics of buildings or into masonry cavity walls.

One of the primary difficulties encountered in the preparation of such foams is the problem of preparing a uniform, fine pore foam, and of blending the foamed component with the other resin component in a manner which will produce and maintain the desired pore structure and will also maintain the bulk of the resin foam. A number of expedients have been resorted to in the past for regulating foam characteristics, a number of which involve first preparing a coarse foam of one of the resin components and thereafter refining the foam by one or more of a variety of expedients as by beating with rotating bristles, forcing the coarse foam through porous frits or through long coils of tubing prior to mixing the foamed component with the second resin-forming component.

An object of the invention is to provide an apparatus for continuously or intermittently producing uniformly blended, low density, urea-formaldehyde foams.

These and other objects are accomplished according to our invention by the apparatus described below and by separately introducing (1) an aqueous urea-formaldehyde resin foam having an average bubble diameter between about 0.1 mm. and about 0.6 mm. and a resin solids concentration between about 20% and about 50% by weight and (2) an aqueous solution of a strong acid having a dissociation constant of at least about $1 \times 10^{-2}$ as hardening agent into one end of a cylindrical zone in weight ratios of hardening agent to foamed resin solution between about 0.1 and about 1.0, and thereafter forcing the combined resinous foam and acid solution to travel in an essentially sinuous or undulant path through at least 3 but not more than 7 successive annular chambers in said zone, through ports in the end walls of such chambers, said ports being positioned alternately first adjacent the center or axial portion of said zone and next adjacent the outer walls of said cylindrical zone, at a rate sufficient to deliver at least about 2 cubic feet of foam per minute at the end of the cylindrical zone, while simultaneously subjecting the foam resin-aqueous acid mixture to a rotational shearing action by the axial rotation within the cylindrical zone of the perforated walls of said annular chambers at a rate between about 900 r.p.m. and about 2,500 r.p.m.

With reference to the drawings:

FIG. 1 illustrates schematically a side elevation of the foam gun.

FIG. 2 illustrates in section the interior of the barrel of the foam gun of FIGURE 1.

Figure 3:
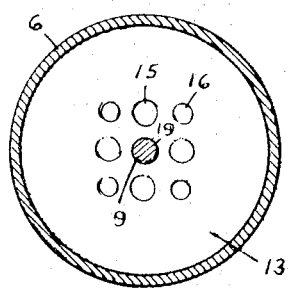
FIG. 3 illustrates one type of disc which may be used in the foam gun (type A).

In the drawings, numeral 1 represents the cylindrical foam gun barrel, 2 is a feed inlet pipe for foamed resin, provided with a ball valve closure 3. Numeral 4 designates a smaller inlet pipe adapted to deliver aqueous acid solution. The foam nozzle is indicated at 5. As shown in FIG. 2, the barrel of the foam gun includes a shell 6 provided with a large foam inlet port 7, and a smaller port 8. Shaft 9, positioned axially within the gun barrel 6 is connected through packing gland 10 and shaft 11 to motor 12 for axial rotation. Mounted on shaft 9 through their centers are a plurality of discs 13 or 13' and 14 of diameters slightly less than the inside diameter of the gun barrel, spaced apart sufficiently to provide substantially equally dimensioned annular chambers within the cylindrical zone of the foam gun barrel. Discs 13 and 13' have perforations 15 and 16, or 15' and 16', preferably eight in number, which can be the same or different size, positioned close to the center of the disc. Alternate discs 14 are provided with holes 18, preferably 4 to 8 in number, positioned adjacent to the periphery of the disc. All the discs are provided with central holes 19 for mounting on shaft 9.

The holes 15 and 16, or 15' and 16', which are arranged about the center of the discs, should preferably have their outer edges spaced not further from the center of the disc than ½ the radius of the disc; the peripherally arranged holes should preferably have their edges not nearer to the center of disc than about ½ the radius of the disc. Discs of the type of 13 or 13' and 14 are positioned alternately on shaft 9 thus producing annular chambers within the cylindrical zone through which a sinous flow path may be traced by the foam travelling from the holes of one disc through the holes of the next succeeding disc.

Figure 5:
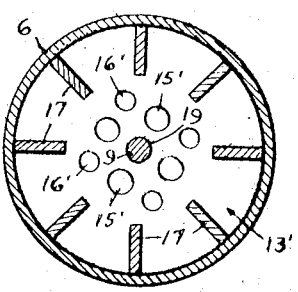
FIG. 5 illustrates a modified form of disc of the A type (type C).

A modified disc 13', as seen in FIGURE 5, which may be used in place of one or more of discs 13, has a group of holes adjacent the center of the disc and a number of baffles or vanes 17 extending perpendicularly on either side of the disc for a distance of preferably not more than about one-third of the radius of the disc.

The discs are of such diameter as to leave as small a clearance as possible between disc and gun barrel walls, to permit free rotation of the discs, thereby reducing to a minimum the direct flow of foam along the gun barrel walls and assuring that substantially all the foam passes through the holes in the successive discs.

The holes in any one disc should be at least four in number, preferably 4 to 8, and the holes may be the same or different sizes, and they may vary in number as long as the total area is adequate to insure the desired progression of the foam through the gun, preferably a few large holes each having an area 7% to 15% of the inlet hose cross-section are provided. The total cross-sectional area of the aforesaid holes in each disc may be equal to or less than the cross-sectional area of the foam transport pipe 2 and inlet 7. However, the total cross-sectional area of the holes in each disc should be not less than about 60% of the cross-sectional area of the foam inlet port and a major proportion of the open area should be provided by large holes as indicated above. Smaller hole areas tend to cause foam collapse, loss of air efficiency, lowered production rates and denser foams. On the other hand, hole areas greater than the area of the foam inlet port are unsatisfactory because, in passing through such holes, the foam tends to collapse and to develop large holes and voids.

Discs 13' as illustrated in FIGURE 5 carrying one or more baffles or vanes mounted near the periphery of the discs and perpendicular thereto are preferred over those of FIGURE 3 for initial and subsequently alternating discs as they afford superior mixing and aid in directing foam through the peripheral holes of the next succeeding disc. Vanes will preferably extend from the periphery of the disc to not more than about ¼ the length of a radius of the disc.

Figure 4:
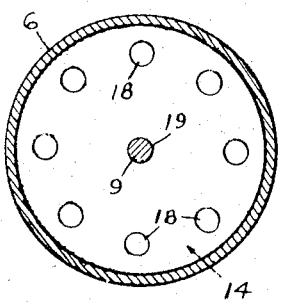
FIG. 4 illustrates another type of disc (type B).

As brought out above, discs having peripheral holes such as shown in FIGURE 4 are alternated with discs having holes adjacent the center of the disc such as either that shown in FIGURE 5 with baffles or that shown in FIGURES 3 with no baffles. Discs with centrally located holes should preferably form the first and last discs of the series.

Rotation of the discs within the foam gun is critical. With no disc rotation, the apparatus fails to produce an acceptable foam, although a high rate of foam delivery is obtained. To produce a "good" foam, i.e. one of uniform, fine pores which is uniformly blended with the hardener solution, and which yields substantially maximum production of low density finished resin foam in terms of cubic feet of foam delivered from the gun per minute, speeds of rotation of the discs should preferably be between about 900 r.p.m. and about 1,300 r.p.m., although "good" foams of slightly higher densities are produced in lower yields (in terms of cubic feet of foam per minute) at speeds up to about 2,500 r.p.m.

A great advantage of the foam gun of our invention is its compact size, so that it readily adapts itself to portable equipment which can be moved about at will to produce foamed insulation at the desired end location, as in the walls and cavities of houses. While gun dimensions are not unduly critical as long as the ratios of foam feed line area to disc hole area are maintained, ratios of total length to diameter between 2:1 and 4:1 are useful and we have found that a foam gun wherein the barrel dimensions are slightly in excess of 2 inches in diameter, for example about 2⅛ inches by about 7¼ inches in length providing a one-inch diameter foam entry port, an initial mixing chamber of about 2 inches in diameter by one inch in length and from 3 to 7 conditioning chambers about 2 inches in diameter by about ½ inch in length produces the desired conditioning and partial curing of foam from a one-inch diameter foam feed line, in a residence time in the gun barrel of between about 0.05 second and about 1.0 second.

In such a gun the discs should be about 2 inches in diameter, thus substantially completely closing the chambers which they define, and thus preventing significant passage of foam along the walls of the gun and channeling substantially all of it through the holes in the discs.

In operation an aqueous urea-formaldehyde resin foam prepared in conventional manner in a suitable foaming chamber, not shown, is delivered to primary inlet chamber 20 of foam mixing gun 1 through pipe 2 and inlet port 7. Aqueous acid solution is delivered to primary inlet chamber 20 through pipe 4 and inlet port 8, both components being under slight positive pressure; the hardener from a pump, not shown, the foamed resin solution under air pressure of about 10 to 20 p.s.i. Shaft 9 is rotated, thus rotating all the perforated discs 13, or 13', and 14. Pressure on the resin components forces foam and hardener solution first through centrally positioned perforations 15 or 15' into the second mixing chamber, thence through peripherally positioned holes 18 into the third chamber, and so on through successive chambers in a sinuous path while subjecting the foam to shearing agitation by virtue of the rotating discs, until it reaches the nozzle or exit portion 5 of the gun whereupon the thoroughly blended and partially hardened foam is directed into the mold or cavity which it is designed to fill, wherein hardening and setting is completed.

The resulting foams when dry are homogenous, free of density lines and flexible. They have low densities in the range between about 0.25 pound per cubic foot and about 3.0 pounds per cubic foot which can be varied at will within this range depending on the solids concentration of the urea-formaldehyde resin solution used, between about 20% and about 50%.

Figure 6:
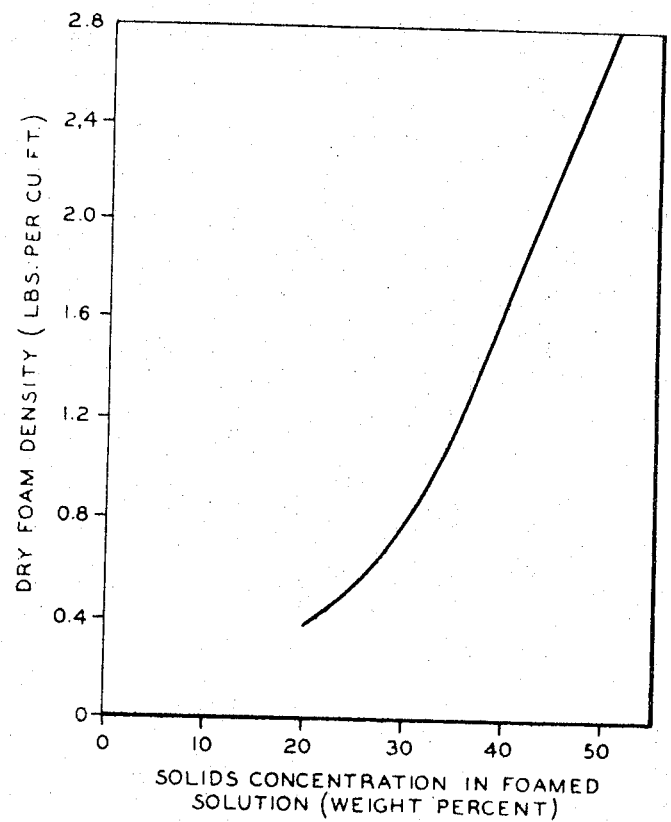
FIG. 6 is a graph plotting the relation of solids concentration in the foamed resin solution to dry foam density in pounds per cubic feet.

The urea-formaldehyde resin solution to be foamed, may be prepared as described in United States Letters Patent No. 3,186,959, issued on June 1, 1965, to Allied Chemical Corporation. The resin as thus prepared will have a total solids content of about 50%. For purposes of foaming, the resin solution is mixed with between about 0.5% and about 5% by weight of a suitable foaming agent such as a neutral or mildly acidic surfactant such as an alkyl aryl sulfonate or the like. This solution can be used directly for frothing, or may be diluted with water down to as low as about 20% solids content to achieve the desired final foam density as illustrated in FIGURE 6.

The hardener solution is an aqueous solution containing between about 1% and about 6% by weight of a strong acid such as sulfuric, phosphoric, hydrochloric or other strong acid having a dissociation constant of at least about $1 \times 10^{-2}$. Because of the very short retention times of the foam in the gun, weak acids such as formic acid are not generally suitable.

Foamed resin solution and hardener solution are delivered to the primary mixing chamber 20 of the foam gun in weight ratios of hardener solution to foamed resin solution between about 0.1 and about 1.0.

The following examples further illustrate our invention:

EXAMPLE 1

A. Resin preparation

To a conical tank was added 18 kilograms of water and 7 kilograms of urea. The contents of the tank were agitated and heated to 90° C., then 20 kilograms of "U.F. Concentrate–85" (a partially reacted mixture of urea and formaldehyde in the form of a mixture of methylol ureas and equivalent to 60% by weight of formaldehyde, 25% of urea and 15% of water) was added slowly over a 20 minute period. After the addition of "U.F. Concentrate–85," 10 ml of concentrated (89%) formic acid was added, bringing the solution pH to 5. The reaction temperature was maintained at 93° C. After 29 minutes, the viscosity had increased to 21 centipoises (measured at 41° C.). The resin formation reaction was stopped after 34 minutes by adding 14.1 ml. of 50% (wt.) aqueous sodium hydroxide solution and by cooling the contents quickly to 25° C. To this resin solution was added 1% $NH_4HCO_3$ to decrease formaldehyde odor. This resin solution (urea-formaldehyde solids concentration of about 53%) is very stable and may be stored for several months and used as needed. Additional urea is added before use as shown below.

The concentrated resin solution prepared above was mixed with water, urea and an alkyl aryl triethanolamine sulfonate surfactant (Nacconol 60S) in the following proportions:

|  | Percent |
|---|---|
| Urea-formaldehyde resin solution | 58.47 |
| Water | 36.00 |
| Urea | 3.66 |
| Surfactant | 1.87 |
|  | 100.00 |

B. Preparation of resin solution foam

The resulting resin solution, containing about 35% total solids was pumped into the foam chamber at an average rate of 4.54 pounds per minute. The foam chamber was a cylinder 12 inches in diameter and 14 inches high. A level control mechanism maintained the liquid level of 11 inches. Air was introduced into the foam chamber at a rate of about four cubic feet per minute via a ¼ inch diameter pipe coil sparger containing nineteen 1/32 inch holes and placed 5 to 6 inches below the liquid level. Atomization of air through the sparger resulted in frothing of the resin solution. The resulting resin froth rose to the top of the foaming chamber, and with continued introductiton of air into the liquid resin and continued production of froth, a stream of resin foam was forced through the transfer pipe 2 to the initial mixture chamber 20 of the foam gun barrel through inlet port 7.

HARDENER SOLUTION

An aqueous acidic hardener solution composed of 97% water and 3% phosphoric acid by weight was introduced into the initial mixing chamber 20 of the foam gun at inlet port 8, at the rate of 2.0 pounds per minute and was blended with the resin foam in passing through the successive chambers of the mixing gun barrel. Total solids of wet foam after blending with hardener was about 25.5%. The foam gun barrel in this test was 2⅛ inches in inside diameter by 7¼ inches long and was provided with eight nylon discs mounted on the axially rotatable shaft, separated from each other with ½ inch spaces. Alternate discs of the types shown in FIGURES 5 and 4, respectively, the first with centrally positioned holes with hole centers about ⅜ inch from the center of the disc and peripheral baffles, followed by a disc with no baffles and peripheral holes whose centers were spaced about ¼ inch from the circumference of the disc. A ½ inch drill motor was used to rotate the discs at 2,200 r.p.m.

After a residence time in the gun barrel of 0.278 second, the semi-hardened foam was discharged at 3.23 cu. ft. per minute through nozzle 5 which was a polyvinyl chloride cone 10 inches long tapering from 2 inches I.D. to one inch I.D. throughout its length, thence into a mold for final hardening and drying.

After 3.33 minutes' operation, the production of foam was stopped by turning off the electric power to the unit and closing the ball valve 3 on the foam transfer hose near the gun entry port. Water was flushed through the gun and after a shutdown of several minutes the production of foam was begun again. Satisfactory foam was made within a few seconds of start-up each time. This start and stop procedure was repeated five times. The test produced a homogeneous, flexible foam having a density of 0.56 to 0.65 pound per cubic foot free of density lines and with very little foam waste.

EXAMPLES 2-7

In order to illustrate the criticality of disc rotation in delivering good finished foams at a high foam delivery rate in terms of foam volume per minute, a series of tests was run substantially as described in Example 1 in which all factors with the exception of disc rotation rate and relative feed rate of foamed resin and hardener solution, were held constant, and the character of the foam produced and the completeness and uniformity of blending were observed for different rates of rotation. The solids concentration of the blended foamed resin-hardener solution foam was between about 15% and about 35% by weight. The density of the finished dry foams ranged from about 0.3 to about 1.2 pounds per cubic foot, the foams produced at the higher rotation rates being the denser. Observations were made on the finished foam after delivery from the gun. Variations in pH values, tested at different locations in the molded foam block prepared from foam produced with different disc rotation speeds, were taken as indicating degree of uniformity of blending of foam and hardener solution. pH readings were taken in an upper corner of the foam block, in the center of the block, and in a lower corner. Results of these tests are shown in Table I below.

TABLE I

| Example No | 2 | 3 | 4 | 5 | 6 | 7 |
|---|---|---|---|---|---|---|
| Foamed Resin Rate, #/min | 2.18 | 1.73 | 2.1 | 2.08 | 2.08 | 2.08 |
| Hardener Solution Rate, #/min | 2.25 | 3.14 | 2.28 | 2.68 | 2.68 | 2.68 |
| Foam Expansion Factor [1] | 70 | 75 | 68.5 | 48.5 | 48.5 | 48.5 |
| Foam Delivery Rate, ft.³/min | 4 | 3.78 | 3.42 | 2.4 | 2.4 | 2.4 |
| Stirrer, r.p.m | 0 | 950–1,000 | 1,300 | 1,500 | 2,000 | 2,500 |
| Foam Quality | [2] | Good | Good | Good | Good | Good |
| pH in Foamed Block: |  |  |  |  |  |  |
| Upper Corner | 2.8 | 3.0 |  |  |  | 3.18 |
| Middle | 3.7 | 3.0 |  |  |  | 3.03 |
| Opp. Lower Corner | 2.55 | 2.8 |  |  |  | 3.18 |
| pH Range | 1.15 | 0.2 |  |  |  | 0.15 |

[1] Volumes of foam per unit volume of resin solution. [2] Poor, holey.

It will be noted from Table I, that when the discs were not rotated as in Example 2, the resulting foam, while delivered in maximum capacity of 4 cubic feet per minute, was nevertheless of poor quality with large holes, and the resulting finished product was extremely non-uniform as indicated by the variation in pH values taken at different locations in the finished foam block. It will be further noted, that best yields of lowest density (most highly expanded) foams were obtained by rotation of the discs at 950–1,000 r.p.m., as shown in Example 3, which delivered 3.78 cubic feet per minute of a 75 volume expanded "good" foam as compared to the 4 cubic feet maximum for no rotation, and that the resulting foamed product was very well blended as indicated by a uniform pH at various locations in the finished foam block. Higher rates of rotation still produced good foams, but less highly expanded (68.5 and 48.5) and at lower bulk rates, i.e. down to 2.4 cubic feet per minute.

While the above describes the preferred embodiments of our invention, it will be understood that departures may be made therefrom within the scope of the specification and claim.

We claim:
1. Apparatus for blending and conditioning a foam, which comprises, an elongated blending chamber of circular cross section, a plurality of fluid component inlet ports communicating with said blending chamber in the vicinity of one end thereof, one of said fluid component inlet ports being adapted for the admission of a foam into said blending chamber, a tapered discharge nozzle disposed at the other end of said blending chamber, a shaft journaled axially within said blending chamber for rotation therein, a plurality of first and second foam treating disc members within said blending chamber, said foam treating members being spaced substantially equidistant from each other and attached to said shaft for rotation therewith so as to subdivide the interior of said blending chamber into a plurality of smaller chambers, the portions of each of said foam treating members most remote from said shaft being disposed at all times close to the portions of the inside walls of said blending chamber adpacent to each foam treating member to prevent substantial flow between the inside walls of said blending chamber and the periphery of a foam treating member adjacent to the wall, said first foam treating disc members having a plurality of vanes affixed to and extending perpendicularly from the peripheral portion thereof, said foam treating members each having an open area which totals at least 60% of the cross-sectional area of the foam inlet port, the open areas in each foam treating member defining at least four separate openings in each member, the cross-sectional area of each opening not exceeding the cross-sectional area of the foam inlet port, each first foam treating member having the openings disposed about the portions thereof adjacent to said shaft, and each second foam treating member having the openings disposed in the vicinity of the peripheral portions of the member, said first and second foam treating disc members having the openings disposed in the vicinity of the peripheral portions of the member, said first and said second foam treating members being alternatingly mounted from said shaft.

References Cited

UNITED STATES PATENTS

| | | | |
|---|---|---|---|
| 1,767,089 | 6/1930 | Miller et al. | 55—232 X |
| 2,772,246 | 11/1956 | Simon et al. | 260—2.5 |
| 2,845,396 | 7/1958 | Krebs et al. | 260—2.5 |
| 2,903,344 | 9/1959 | Rollman et al. | 23—285 |
| 3,043,670 | 7/1962 | Vieli | 23—285 |

JAMES H. TAYMAN, Jr., *Primary Examiner.*

MURRAY TILLMAN, *Examiner.*

M. FOELAK, *Assistant Examiner.*